E. F. LOISEAU.
Machine for Mixing and Molding Artificial Fuel.
No. 167,913.           Patented Sept. 21, 1875.
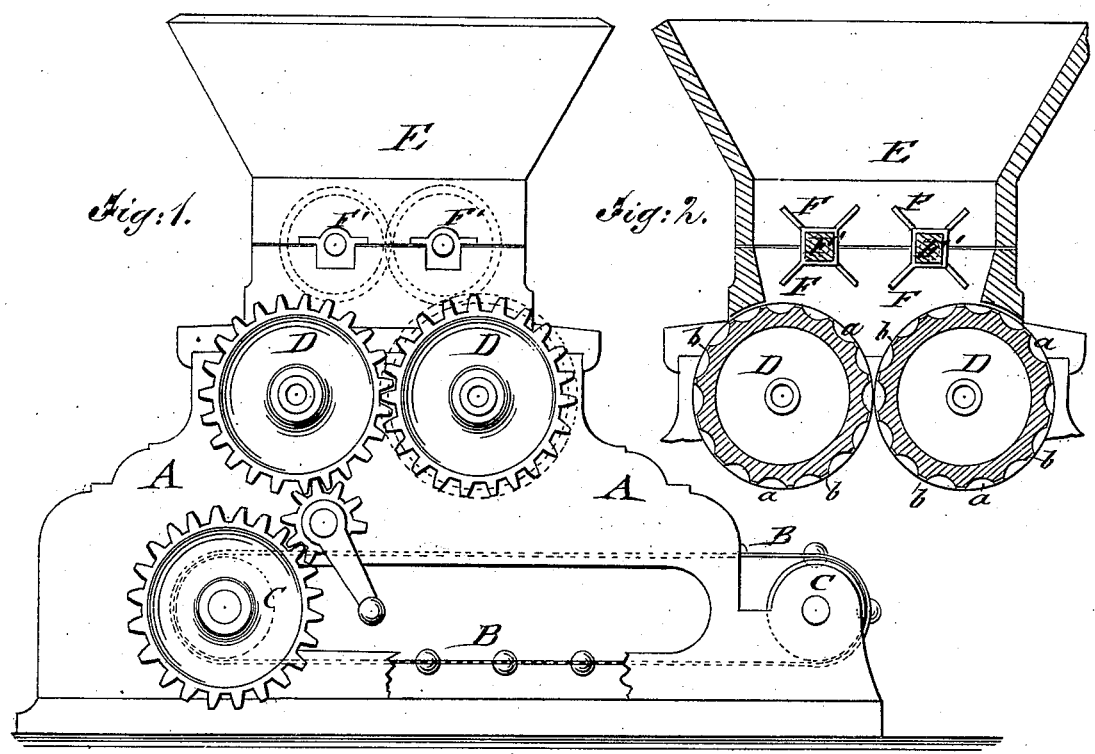
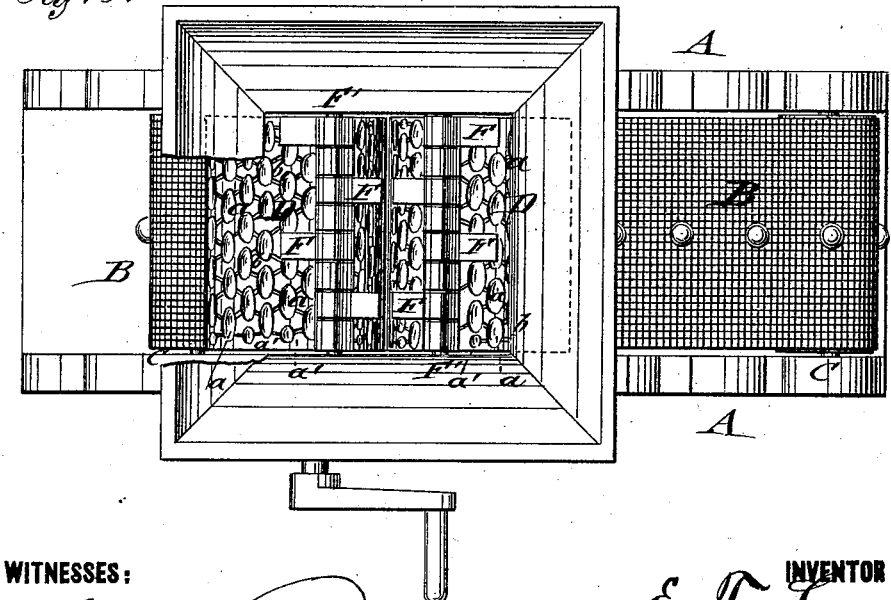
WITNESSES:
INVENTOR:
E. F. Loiseau
BY
ATTORNEYS.

UNITED STATES PATENT OFFICE.

EMILE F. LOISEAU, OF PHILADELPHIA, PENNSYLVANIA.

IMPROVEMENT IN MACHINES FOR MIXING AND MOLDING ARTIFICIAL FUEL.

Specification forming part of Letters Patent No. 167,913, dated September 21, 1875; application filed August 21, 1875.

*To all whom it may concern:*

Be it known that I, EMILE F. LOISEAU, of Philadelphia, in the county of Philadelphia and State of Pennsylvania, have invented a new and Improved Machine for Mixing and Molding Artificial Fuel, of which the following is a specification:

In the accompanying drawing, Figure 1 represents a side elevation of my improved machine for mixing and molding artificial fuel; Fig. 2, a vertical transverse section of the molding-cylinders; and Fig. 3, a top view of the machine.

Similar letters of reference indicate corresponding parts.

My invention relates to improvements in the apparatus for mixing and molding artificial fuel for which Letters Patent have been granted to me under date of February 17, 1874, and No. 147,665, so that the operation of the machine is perfected and facilitated, and its construction simplified.

The invention consists, mainly, in the construction of the molding or compressing cylinders with cavities or recesses connected with each other by small channels or openings, and in arranging at the ends of the alternate rows of cavities or recesses, near the ends of the cylinders, small recesses for preventing the contact of larger portions of the metallic surface of the cylinders. The composition is fed in granulated state to the molding-cylinders by a top hopper with revolving stirrer-shafts.

In the drawing, A represents the supporting-frame of my machine for molding artificial fuel; and B, an endless apron or belt, which is propelled by revolving rollers or drums C C below the molding and pressing cylinders D, to take up the molded lumps of artificial fuel dropped thereon. The molding-cylinders D are cast solid or hollow to admit the introduction of steam. They are made of equal size, and driven by suitable gearing in connection with the driving-shaft, so that their outer surfaces run in contact with each other. On the surface of the cylinders or rollers D are milled out a series of cavities or recesses, $a$, which register with each other as the cylinders revolve, and form chambers of spherical, oval, or other form, according to the shape of the lumps in which the fuel is desired to be brought into market. These cavities extend in close proximity to each other in regular rows over the whole length of the cylinders, the cavities of every other row being intermediately between the cavities of the adjoining rows in the nature of the cells of a honey-comb, so that small metallic contact-surfaces on the cylinders are formed and the entire surface of the molding-rollers utilized for compressing the composition into lumps. At the ends of the intermediate rows of cavities, near the outer edges of the cylinders, are smaller cavities $a'$, milled out for the purpose of avoiding the contact-spaces of solid metal formed at these points and preventing the entrance of small portions of the composition between larger contact-surfaces, and any interference with the regular working of the rollers. The prepared composition is received and compressed by the molding cavities and delivered onto the revolving apron beneath. In order to facilitate the delivery of the lumps from the cavities, they are made of greater width than depth, so that the thickness of the lumps is smaller than the width of the same. The cavities $a$ and $a'$ are connected with each other by small channels $b$, that allow the escape of air and excess of material, each cavity or recess communicating thus by four, respectively two, channels with the surrounding cavities. These channels or openings form, when the lumps are molded, thin connecting-pieces of compressed coal, which break off when the lumps fall on the apron beneath. The diameter of the molding-roller varies according to the size of the lumps to be produced. The hopper E has a square bottom opening about as large as the diameter of the molding-rollers. The liquid composition is conveyed into the hopper and stirred therein by revolving stirrer-blades or paddles F, which are slipped or keyed to shafts $F'$. The composition is sometimes too soft and plastic when it comes from the mixer to fill the molds evenly and retain its shape, and the powerful stirring of the mass by the stirrer-blades revolving in opposite directions, renders the same more fit for being molded by keeping the material in granulated state and causing the lumps to retain their shape. In this way all the lumps molded are good, none of them break, and they have all the same density, and drop easily out of the cavities on the separation of the cylinders.

Having thus described my invention, I claim as new and desire to secure by Letters Patent—

1. The solid or hollow molding-cylinders, having on their outer surfaces a series of cavities or recesses, which are connected, by small channels or openings, with the adjoining cavities, to allow the escape of air and excess of material, substantially as and for the purpose set forth.

2. The molding-cylinders, having smaller cavities or recesses at the ends of the alternating rows of the larger molding-cavities, and being also connected by small channels therewith, for the purpose of avoiding large contact-spaces on the roller-surfaces, substantially as specified.

EMILE F. LOISEAU.

Witnesses:
H. L. PERRET,
DANIEL LIECHTY.